Nov. 6, 1951 — F. E. HENDRICKSON — 2,574,037
BUFFING WHEEL
Filed Jan. 10, 1947
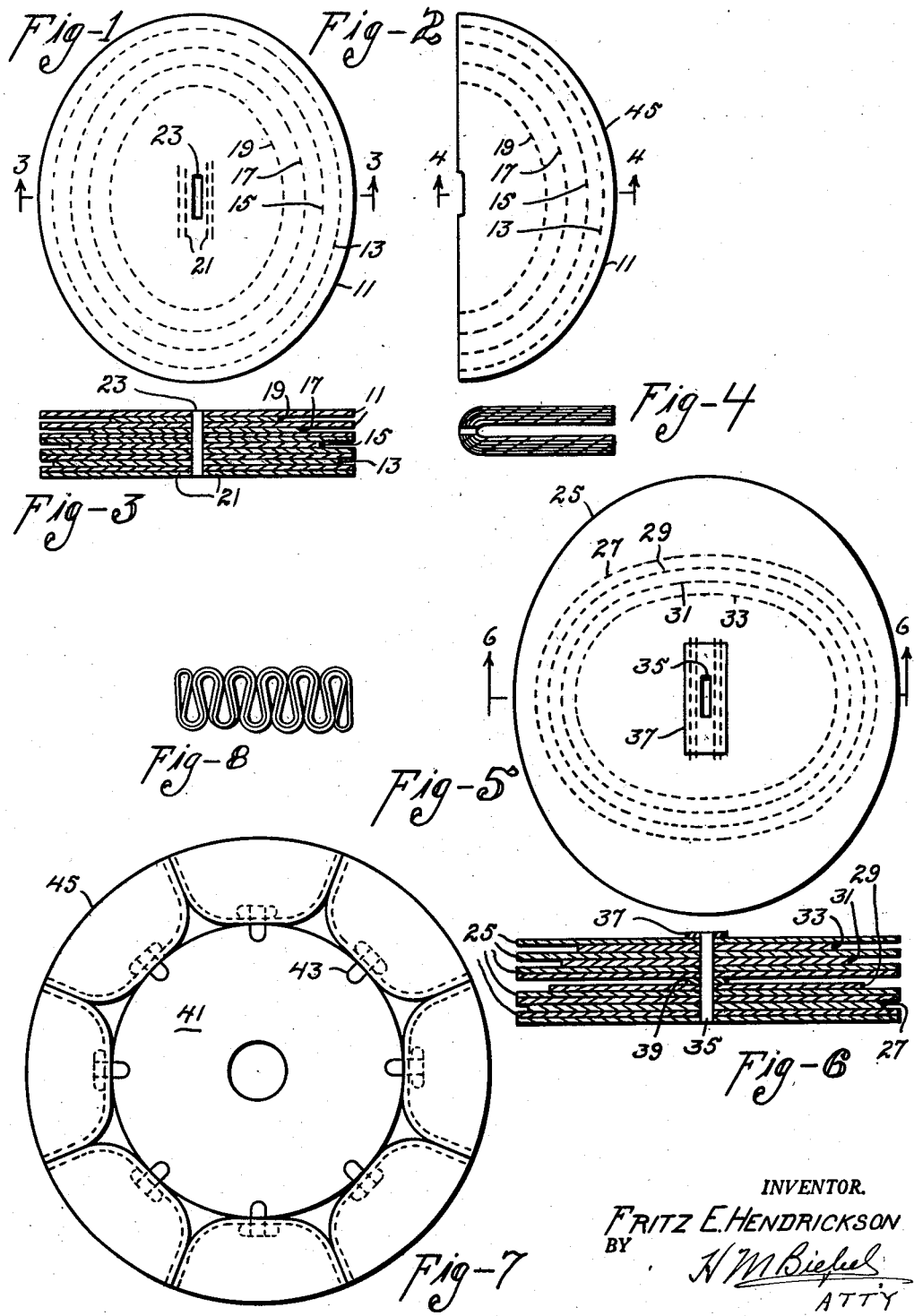
INVENTOR.
FRITZ E. HENDRICKSON Patented Nov. 6, 1951

2,574,037

UNITED STATES PATENT OFFICE 2,574,037

BUFFING WHEEL

Fritz E. Hendrickson, South Elgin, Ill., assignor of fifty per cent to Murray Ireland, Elgin, Ill.

Application January 10, 1947, Serial No. 721,393

3 Claims. (Cl. 51—193)

My invention relates to buffing wheels and particularly to composite buffing wheels.

One of the objects of my invention is to provide a composite buffing wheel that shall be so constructed as to have substantially the same hardness with decreasing outer diameter.

Another object of my invention is to provide a composite buffing wheel that shall be so constructed as to have substantially the same degree of hardness along the peripheral length of the flexible elements.

Another object of my invention is to provide a composite buffing wheel that shall be so constructed as to provide an increase in the working surface of the wheel with decrease of external diameter.

Other objects of my invention will either be apparent from a description of several forms of flexible elements embodying my invention or will be pointed out in the course of such description and set forth particularly in the appended claims.

In the drawings,

Fig. 1 is a view in front elevation of a flexible segment embodying my invention, Fig. 2 is a view in side elevation of a flexible segment folded upon itself once.

Fig. 3 is a transverse sectional view taken on the line 3—3 of Fig. 1,

Fig. 4 is a transverse sectional view taken on the line 4—4 of Fig. 2,

Fig. 5 is a view in front elevation of a modified form of flexible element embodying my invention, Fig. 6 is a transverse sectional view taken on the line 6—6 of Fig. 5, Fig. 7 is a view in side elevation of a buffing wheel embodying my invention, and, Fig. 8 is an outer peripheral edge view of one of the buffing elements as assembled on the hub member.

Referring first of all to Figs. 1 to 4 inclusive, I have there shown a resilient or flexible section or element embodying a plurality of flexible textile oval-shaped plies 11, the dimension of said plies being a predetermined one and the dimensions as to both the major and the minor axes being substantially the same. I provide also a smaller number of interspaced relatively smaller plies 13, 15, 17 and 19, the major axes of which extend in substantially the same direction as do the major axes of plies 11, the dimensions of said plies being progressively smaller. I provide a plurality of seams 21 extending along the major axes of the assembled plies so as to hold them together in properly assembled positions. I provide also an elongated central aperture 23 in all of the plies.

Referring now to Figs. 5 and 6, I have there shown a modification of a flexible element embodying my invention and comprising a plurality of flexible textile plies 25 of substantially oval shape and of predetermined outer dimensions. Interspaced with plies 25 I provide a lesser number of oval-shaped textile progressively smaller flexible plies 27, 29, 31 and 33, the major axes of plies 27, 29, 31 and 33 extending substantially at right angles to the major axes of plies 25. Each of the plies of which the element consists is provided with a central aperture 35 therein, said elongated central aperture extending substantially in the same direction as the major axes of plies 25. I provide also a pair of relatively thick reinforcing pieces of cloth 37 and 39, of which member 37 is positioned at one side of the assembled plies while element 39 is positioned in substantially the middle of the assembled plies and it is to be understood that plies 27, 29, 31 and 33 extend at right angles of the major axes of plies 25. Substantially the same comments as made hereinbefore with regard to plies 25, 27, 29, 31 and 33 apply also to Figs. 1 to 4 inclusive.

Referring now to Fig. 7 of the drawings, I have there shown a composite buffing wheel comprising a pair of central discs 41 having an opening therein for permitting of mounting the same upon a driving and supporting shaft (not shown). Each of the discs 41 is provided with a plurality of L-shaped hooks 43, the outer ends of which extend in the same general direction on one of the discs, while the outer ends extend in the opposite direction on the second disc so that when these L-shaped members have been inserted in the openings 23 or 35 and the discs, together with the hook-shaped ends, have been moved to occupy substantially the position shown in Fig. 7 of the drawings the elements 45 comprising either plies 11, 13, 15, 17 and 19, or plies 25, 27, 29, 31 and 33, will occupy substantially the positions shown in Fig. 7 of the drawings. It may be pointed out that the outer end portions of each of the elements 45 are positioned in abutting relation relatively to each other and that the peripheral dimension provided for occupancy by the plies is less than that which would be occupied by an element 45 when the same is mounted for instance on discs 41 by itself.

I have shown in Fig. 8 of the drawings one form which the plies may take when they are thus mounted in closely abutting position on hook-members or supporting-members in crowded peripherally adjacent positions beyond the outer periphery of the disc. It will be noted, particularly for the elements shown in Figs. 5 and 6, that the space occupied by the extreme outer end portions of assembled element 45 will have substantially the same thickness as to the number of plies per unit of peripheral length as is occupied by the inner portion of the element 45. I wish further to point out that the tendency of the crowded peripherally adjacent sections 45 will be to cause the plies to extend in substantially zigzag shape laterally along the line of the peripheral dimension of the assembled sections. While it may at first sight appear not to make any particular difference whether the density of the plies peripherally around the buffing wheel is uniform or not, I have found that it is much better and productive of much better results as to polishing on certain materials provided the number of plies is substantially the same peripherally of the buffing wheel and my new buffing wheel, and particularly that shown in Figs. 5 and 6 thereof, accomplishes this object.

The use of a lesser number of plies of oval shape and of lesser external dimensions, say four plies out of a total of 12 plies per section provides an increase in what I call the working surface of the buffing wheel as soon as the outer diameter of the buffing wheel has been reduced so that ply 27 will also engage the work. That is, a piece of work being polished, is engaged at first by only eight plies, but is engaged by nine plies as soon as the external diameter of the buffing wheel has been decreased to such an extent that ply 27 also engages the work. Further decrease of outer diameter then successively causes ten, then eleven and then twelve plies to engage the work and it is to be noticed that the peripheral extent of each of the plies 27, 29, 31 and 33 engaging the work increases with decreasing outer diameter.

I have also found that the use of a lesser number of plies decreasing external or outer dimensions provides substantially the same degree of hardness with decreasing diameter. This I take to be the result of the decrease of centrifugal force on the outer parts of the flexible plies with decreasing diameter. With a new wheel the peripheral speed of the outermost parts of the buffing wheel is a maximum and will, in general, be so great as to impart a relatively great degree of hardness to the outermost fibers of the plies. But when the outer diameter of the wheel has been decreased to say three-quarters of its original outer diameter, the centrifugal force will be only about one-half that of the original diameter wheel, whereby the hardness of the wheel is greatly reduced. By providing additional plies the hardness of the wheel may be maintained substantially constant irrespective of the decrease of the outer diameter of the wheel.

By increase of working surface of the buffing wheel I mean to convey the idea that the peripheral length of certain of the plies engaging the piece of work is increased.

Various modifications may be made in the device embodying my invention without departing from the spirit and scope thereof and I desire that all such modifications coming clearly within the scope of the appended claims shall be considered a part of my invention.

I claim as my invention:

1. In a folded buffing section for a composite buffing wheel having a rotatable central hub with a plurality of holding means at the periphery thereof for supporting folded buffing sections thereon, in combination, a plurality of separate flexible oval plies having substantially the same size, a plurality of smaller oval plies, graduated in size and interspaced with the larger plies, the major axes of the larger plies lying substantially parallel to each other, the major axes of the smaller plies lying substantially parallel to each other but lying across the major axes of the larger plies, all said plies lying together and having a fold that embraces all said plies, said plies including means near the folded edge for engaging the hub and fastening said section thereto, and a binder near said hub-engaging means for holding said plies together.

2. A folded buffing section adapted to form a part of a composite buffing wheel having a rotatable central hub with a plurality of holding means at the periphery thereof for supporting folded buffing sections thereon, and comprising a plurality of separate flexible plies having the same size and shape, a plurality of plies interspaced therewith having smaller overall dimensions, said smaller plies being graduated in size to maintain the hardness of the buffing section substantially constant during its wear, all of said plies lying together and having a fold that embraces all of said plies, said plies including means near the folded edge for engaging the hub and fastening said section thereto, and a binder near said hub-engaging means for holding said plies together.

3. A folded buffing section adapted to form a part of a composite buffing wheel having a rotatable central hub with a plurality of holding means at the periphery thereof for supporting folded buffing sections thereon, and comprising a plurality of separate flexible oval plies having substantially the same size and lying with their major axes substantially parallel to each other, a plurality of plies interspaced therewith having smaller overall dimensions, said smaller plies being graduated in size to maintain the hardness of the buffing section substantially constant during its wear, all of said plies lying together and having a fold that embraces all of said plies, said plies including means near the folded edge for engaging the hub and fastening said sections thereto, and a binder near said hub-engaging means for holding said plies together.

FRITZ E. HENDRICKSON.

REFERENCES CITED

The following references are of record in the file of this patent:

UNITED STATES PATENTS

| Number | Name | Date |
|---|---|---|
| Re. 15,226 | Levett | Nov. 21, 1921 |
| 616,184 | Demmler | Dec. 20, 1898 |
| 1,515,818 | Yerges | Nov. 18, 1924 |
| 1,820,465 | Levett | Aug. 25, 1931 |
| 1,946,630 | Levett | Feb. 13, 1934 |
| 2,280,399 | Garling | Apr. 21, 1942 |

FOREIGN PATENTS

| Number | Country | Date |
|---|---|---|
| 84,786 | Austria | July 25, 1921 |